United States Patent [19]

Schaeffer

[11] 3,920,078

[45] Nov. 18, 1975

[54] TRASH CUTTING MEANS FOR PLOWS

[76] Inventor: Norman E. Schaeffer, 9124 W. 72nd St., Shawnee Mission, Kans. 66204

[22] Filed: Dec. 13, 1971

[21] Appl. No.: 207,692

Related U.S. Application Data

[63] Continuation of Ser. No. 883,492, Dec. 9, 1969, abandoned.

[52] U.S. Cl. .................. 172/39; 172/66; 172/111
[51] Int. Cl. ........................................... A01b 33/00
[58] Field of Search ......... 172/169, 107, 28, 31, 52, 172/71, 100, 108, 111, 522, 66, 39, 609, 67

[56] References Cited
UNITED STATES PATENTS

| | | | |
|---|---|---|---|
| 2,638,042 | 5/1953 | Barstow et al. ................ | 172/111 X |
| 3,503,449 | 3/1970 | Schaper .............................. | 172/39 |
| R25,237 | 9/1962 | Heeren .......................... | 172/111 X |

Primary Examiner—Edgar S. Burr
Assistant Examiner—R. T. Rader
Attorney, Agent, or Firm—Schmidt, Johnson, Hovey & Williams

[57] ABSTRACT

A trash-clearing attachment for agricultural implements has a blade disposed in a horizontal plane between the implement frame and a tool therebelow and secured to an upright shaft for rotation about the longitudinal axis thereof. The shaft is held by bearings on the frame which may be shifted in a horizontal direction to vary the location of the blade with respect to the tool. A hydraulic motor on the frame is connected to the shaft through a flexible belt arrangement for driving the blade upon actuation of the motor.

2 Claims, 6 Drawing Figures

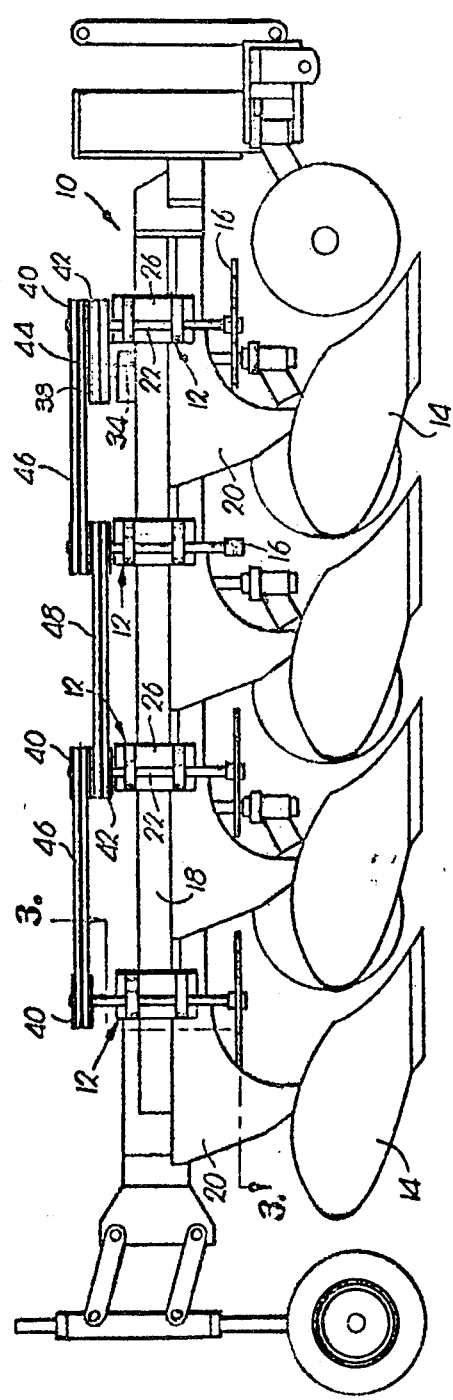
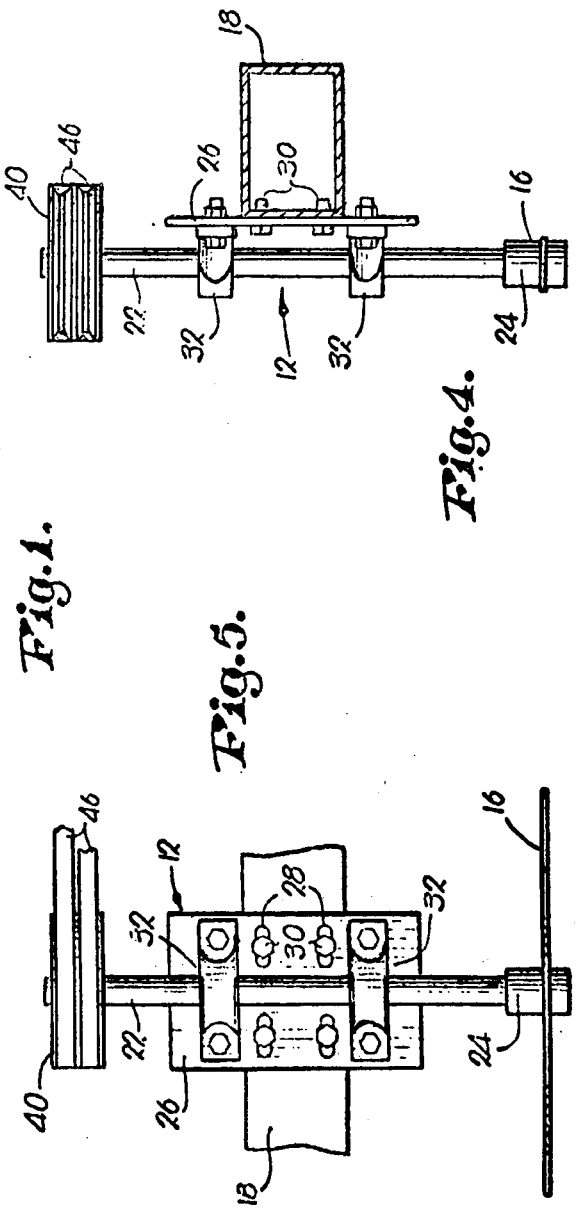
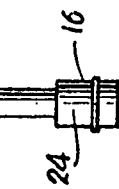

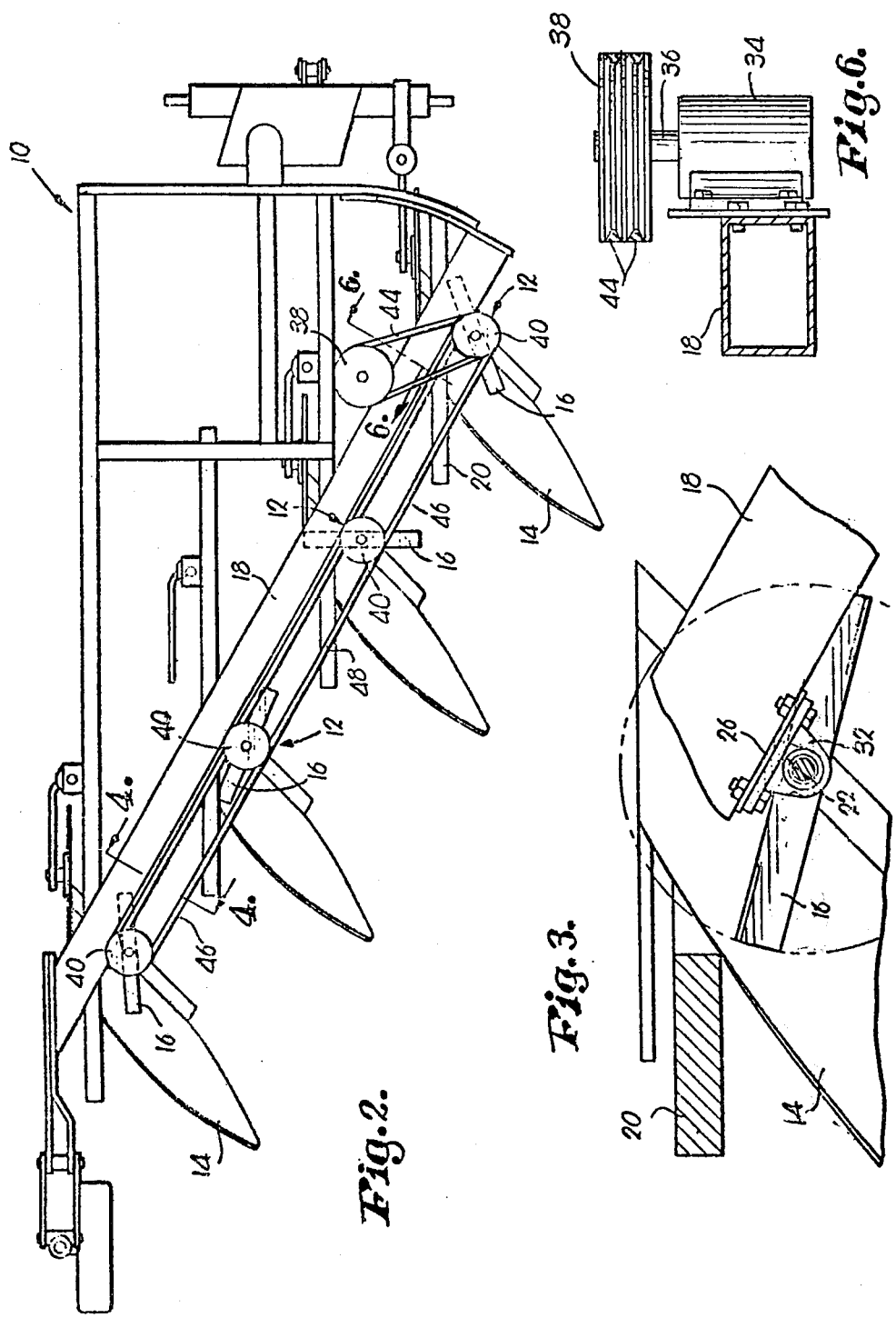

TRASH CUTTING MEANS FOR PLOWS

This is a continuation, of application Ser. No. 883,492, filed Dec. 9, 1969, now abandoned.

This invention relates to farm implements and, more particularly, to an attachment for clearing trash which has accumulated beneath the frame of an implement as it is advanced through a field.

The operation of a farm implement, particularly a tillage implement such as a plow, is often hampered by the collection of weeds, stubble, and other trash as the plow is advanced across a field. In some instances the accumulation and buildup of such trash between the plow frame and the ground is such that the plow bottoms may be completely lifted from the ground, or at least into only partially effective positions. At other times the accumulated trash is only sufficient to increase the work load of the towing vehicle by increasing the drag, thereby decreasing the overall efficiency of the operation. In either case, when such a buildup occurs, it is necessary for the operator to stop and remove the trash by hand before proceeding.

After a field of corn has been picked, it is sometimes necessary to chop the stalks into smaller pieces before plowing them under in an effort to facilitate the plowing operation. Manifestly, this requires an additional operation with an appropriate implement, thereby creating an added expense in terms of time and money which should be avoided if at all possible.

In view of the above problems, it is an important object of the present invention to provide an attachment for a farm implement, particularly a plow, which prevents the undesirable buildup of trash beneath the implement frame as it is advanced through a field, thereby eliminating the need for periodic, manual clearing of the trash.

A further important object of the invention is to provide an attachment as aforesaid which is capable of cutting through heavy cornstalks and the like during plowing, thereby eliminating the time and expense incurred by a preliminary stalk-cutting operation.

Another important object of the instant invention is to provide a trash-clearing attachment which may be used with multiple bottom plows as well as single bottom plows.

In the drawings:

FIG. 1 is a side elevational view of a four-bottom plow utilizing a series of trash clearing devices constructed in accordance with the teachings of the present invention;

FIG. 2 is a top plan view thereof;

FIG. 3 is an enlarged, fragmentary cross-sectional view taken along line 3—3 of FIG. 1 illustrating the position of the cutter blade with reference to structure members of the plow;

FIG. 4 is an enlarged, fragmentary cross-sectional view of an attachment taken along line 4—4 of FIG. 2;

FIG. 5 is an enlarged, fragmentary elevational view of the rearmost clearing device; and FIG. 6 is an enlarged, fragmentary cross-sectional view taken along line 6—6 of FIG. 2 illustrating the hydraulic motor used to power the clearing devices.

The four-bottom plow 10 of FIG. 1 has a series of trash cutting devices 12 mounted thereon above each of the plow bottoms 14. Each clearing device 12 includes a rotary blade 16 which is rotatably mounted beneath an oblique frame member 18 of plow 10, above a corresponding plow bottom 14, and closely adjacent (FIG. 3) a downwardly extending arm 20 which supports the bottom 14. The blade 16 is disposed in a generally horizontal plane, and is mounted on member 18 for rotation about an upright axis by apparatus which includes an elongated, upright element 22, the blade 16 being rigidly secured to one end of element 22 by collar means 24.

The mounting apparatus further includes an upstanding plate 26 having four horizontal slots 28 therein which receive bolts 30 holding the plate 26 to one side face of the member 18. A pair of vertically spaced pillow block bearings 32 fastened to the plate 26 are disposed in vertical alignment and journal the element 22 for rotation with blade 16 about the longitudinal axis of element 22.

The cutter devices 12 are driven by a hydraulic motor 34 which is bolted to the opposite face of member 18 forwardly of plow 10. Suitable fluid supply lines and a pump (not shown) actuate motor 30. The output shaft 36 of motor 34 is disposed for rotation about a vertical axis and carries a double grooved sheave 38 adjacent its outer end. The forwardmost cutting device 12 has a pair of such sheaves 40 and 42 secured to the upper end of element 22 thereof, there being flexible belt structure 44 entrained about sheaves 38 and 42 to effect rotation of blade 16 upon actuation of the motor 34.

The two middle devices 12 likewise carry a pair of sheaves 40 and 42 adjacent the outer ends of their respective elements 22, while the rearmost device 12 carries only sheave 40. The sheaves 40 are interconnected by means of drive belts 46, and the sheaves 42 on the middle devices 12 are interconnected by a belt 48, whereby all the devices operate in unison upon actuation of the motor 34.

Prior to placing the clearing device 12 in operation, the blade 16 of each device may be adjusted in a horizontal plane to insure clearance of the adjacent arm 20 by loosening the adjustable bolts 30 and shifting plate 26. This adjustment may also be used to tighten the interconnecting drive belts 44—48. When blades 16 have been disposed in their proper positions bolts 30 should be tightly secured so they are not vibrated loose during operation.

As plow 10 advances through the field and each of the plow bottoms 14 turn soil containing various amounts of trash material, the rotating blades 16 engage and sever the material and tend to throw the cleared trash to either side of the plow frame. In this manner a buildup of trash between the frame and the ground is effectively prevented such that the operator is not required to stop periodically and clear the accumulated trash by hand. The strategic locations of the blades 16 also permits them to engage and clear trash from the respective arms 20 as well as from the frame member 18.

Having thus described the invention, what is claimed as new and desired to be secured by letters patent is:

1. In a multi-bottom, mobile, ground-plowing assembly having a normal direction of forward travel, frame structure spaced above ground level, a plurality of downwardly extending arms mounted on and depending from said frame structure in spaced relationship to each other, and a corresponding plurality of ground-engaging plow members each mounted on a corresponding arm adjacent the lower extremity of the latter and in downwardly spaced relationship to said frame structure, the improvement of which comprises power driven means for cutting away trash otherwise tending to accumulate above ground level on the forward extremities of said arms between said frame structure and the upper extremities of said plow members during travel of said assembly in said direction, said cutting means comprising:

a plurality of rotary cutter devices each having a plurality of elongate, substantially coplanar cutting blades;

means on said frame structure adjacent the upper extremity of each of said arms respectively for mounting a corresponding one of said plurality of cutter devices for rotation about a corresponding substantially vertical axis, with the path of travel of said blades of each of said cutter devices during rotation of the latter being disposed in a substantially horizontal and substantially planar, circular zone extending in front of the corresponding of said arms and into proximity with the latter at a level beneath said frame, above ground level, and above the level of the upper extremity of the corresponding plow member;

power means common to said cutter devices; and drive means for operably coupling said power means with each of said cutter devices to rotate the latter and move said blades thereof in said respective zones of travel thereof to cut away and prevent accumulation of trash on said arms between said frame and the upper extremities of said plow members.

2. The invention of claim 1, wherein each of said device mounting means includes a bearing means, means for mounting said bearing means on said frame structure, an elongate shaft element rotatably journaled in said bearing means and extending downwardly from the latter, and means for rigidly securing the corresponding cutter device to said element adjacent the lower end of said element, each of said bearing mounting means being adjustable for selectively positioning the corresponding bearing means to shift said zone of travel of the blade of the corresponding cutter device rearwardly toward or forwardly away from the front of the corresponding arm.

* * * * *